(12) United States Patent
Ferguson et al.

(10) Patent No.: US 9,540,265 B2
(45) Date of Patent: Jan. 10, 2017

(54) CHEMICAL FEEDER

(71) Applicant: Axiall Ohio, Inc., Atlanta, GA (US)

(72) Inventors: Richard H. Ferguson, Cecil, PA (US); John Gary Miller, Waxhaw, NC (US); Frank Schiffman, Pittsburgh, PA (US)

(73) Assignee: AXIALL OHIO, INC., Atlanta, GA (US)

( * ) Notice: Subject to any disclaimer, the term of this patent is extended or adjusted under 35 U.S.C. 154(b) by 8 days.

(21) Appl. No.: 14/642,790

(22) Filed: Mar. 10, 2015

(65) Prior Publication Data

US 2015/0284274 A1 Oct. 8, 2015

Related U.S. Application Data

(60) Provisional application No. 61/975,023, filed on Apr. 4, 2014.

(51) Int. Cl.
*B01F 1/00* (2006.01)
*C02F 1/68* (2006.01)
*C02F 1/76* (2006.01)
*C02F 103/32* (2006.01)
*C02F 103/42* (2006.01)

(52) U.S. Cl.
CPC ............. *C02F 1/688* (2013.01); *B01F 1/0016* (2013.01); *B01F 1/0033* (2013.01); *C02F 1/76* (2013.01); *B01F 2001/0061* (2013.01); *C02F 2103/32* (2013.01); *C02F 2103/42* (2013.01); *C02F 2201/004* (2013.01); *C02F 2209/40* (2013.01); *C02F 2303/04* (2013.01); *C02F 2303/185* (2013.01)

(58) Field of Classification Search
CPC .................. B01F 1/0016; B01F 1/0033; B01F 2001/0061; C02F 1/688; C02F 1/76; C02F 2103/32; C02F 2103/42; C02F 2209/40; C02F 2303/04; C02F 2303/185
See application file for complete search history.

(56) References Cited

U.S. PATENT DOCUMENTS

| | | |
|---|---|---|
| 2,820,701 A | 1/1958 | Leslie |
| 5,089,127 A | 2/1992 | Junker et al. |
| 5,384,102 A | 1/1995 | Ferguson et al. |
| 5,427,748 A | 6/1995 | Wiedrich et al. |
| 5,441,073 A | 8/1995 | Hoadley |
| 5,810,043 A | 9/1998 | Grenier |
| 6,138,703 A | 10/2000 | Ferguson et al. |

(Continued)

*Primary Examiner* — Lucas Stelling
(74) *Attorney, Agent, or Firm* — The Webb Law firm

(57) ABSTRACT

The present invention relates to a chemical feeder that includes a housing having a housing chamber, a sieve plate residing within the housing chamber, and a funnel residing on an upper surface of the sieve plate. The funnel includes upper and lower openings, an interior funnel space, and at least one funnel sidewall aperture. The sieve plate includes a plurality of sieve plate apertures at least a portion of which are in fluid communication with the interior funnel space via the lower funnel opening. During operation, a feed liquid passes up through at least a portion of the sieve plate apertures and into the interior funnel space where it contacts a solid chemical material, so as to form a treated liquid that includes dissolved chemical material, at least a portion of which passes out through the funnel sidewall aperture(s) and exits the chemical feed through an outlet.

14 Claims, 4 Drawing Sheets

(56) References Cited

U.S. PATENT DOCUMENTS

| | | |
|---|---|---|
| 6,298,871 B1 | 10/2001 | Pickens et al. |
| 6,517,727 B2 | 2/2003 | Pickens et al. |
| 6,544,487 B1 | 4/2003 | Ferguson et al. |
| 7,081,232 B1 | 7/2006 | Dooley, Jr. et al. |
| 7,604,018 B2 | 10/2009 | King et al. |
| 2005/0150823 A1 | 7/2005 | Eserkaln et al. |
| 2010/0012560 A1 | 1/2010 | Sims et al. |
| 2012/0111962 A1* | 5/2012 | Hayas ............... B01F 1/0033 239/1 |

* cited by examiner

CHEMICAL FEEDER

CROSS REFERENCE TO RELATED APPLICATION

The present application is entitled to and claims priority to U.S. Provisional Patent Application No. 61/975,023, filed on Apr. 4, 2014, the disclosure of which is incorporated herein by reference in its entirety.

FIELD

The present invention relates to a chemical feeder that includes a housing having a housing chamber, a sieve plate within the housing chamber that includes a plurality of sieve plate apertures, and a funnel that resides on an upper surface of the sieve plate and which contains a solid chemical material that is exposed to a feed liquid that passes up through at least some of the sieve plate apertures.

BACKGROUND

Chemical feeders can be used to produce various mixtures, such as aqueous solutions of water treating agents that can be used for the disinfection of effluent from sewage treatment plants, for the chlorination of water in swimming pools and hot tubs, and for the delivery of other water soluble chemicals to aqueous streams and water systems. In some instances, a solid treatment chemical is placed within the chemical feeder, where it comes into contact with a liquid, such as water, introduced therein so as to form a treated liquid composition, such as a treated aqueous composition. It is typically desirable that the chemical feeder produce treated liquid compositions that contain a controllable and reproducible level of treatment chemical therein. Variability in the rate at which a solid treatment chemical dissolves in the liquid that is introduced into the chemical feeder can result in an undesirable variation in the concentration of treatment chemical in the treated liquid that is removed from the chemical feeder during operation thereof. In the case of sanitizing treatment chemicals, for example, such variability in the concentration of the sanitizing chemical(s) can result in reduced sanitizing properties, when the concentration drops below a minimum threshold, or toxicity, when the concentration rises above a maximum threshold. In some situations, the solid treatment chemical charged to a chemical feeder is exposed to excess liquid, which results in the solid treatment dissolving too quickly, and/or the formation of a treated liquid having an undesirably high level of treatment chemical. The solid treatment chemical dissolving too quickly can result in the need to frequently charge the chemical feeder with new or replacement solid treatment chemical.

It would be desirable to develop new chemical feeders that can be used to produce treated liquid compositions from solid treatment chemicals. It would be further desirable that such newly developed chemical feeders provide a desirable rate at which the solid treatment chemical dissolves, and a controllable, reliable, and reproducible level of treatment chemical in the treated liquid compositions that are removed from the chemical feeder.

SUMMARY

In accordance with the present invention, there is provided, a chemical feeder comprising: (a) a housing having a housing base and a housing sidewall that together define a housing chamber within said housing; (b) a sieve plate having an upper surface, a lower surface, and a plurality of sieve plate apertures extending from the lower surface to the upper surface of the sieve plate, wherein the sieve plate is positioned within the housing chamber and above an inner surface of the housing base; (c) a funnel comprising an upper funnel end defining an upper funnel opening, a lower funnel end defining a lower funnel opening, and a funnel sidewall extending from the upper funnel end to the lower funnel end, wherein the upper funnel opening is larger than the lower funnel opening, the funnel sidewall comprises at least one funnel sidewall aperture located in a lower portion of the funnel sidewall, the funnel sidewall defines an interior funnel space, the funnel is positioned within the housing chamber, the lower funnel end is positioned on the upper surface of the sieve plate, and at least some of the plurality of sieve plate apertures are in fluid communication with the interior funnel space through (or by way of) the lower funnel opening; (d) at least one inlet in the housing through which a feed liquid is introduced into the housing, the inlet being positioned below the sieve plate; and (e) at least one outlet in the housing through which a treated liquid comprising dissolved chemical material is removed from the housing. At least some of the feed liquid introduced into the housing chamber through the inlet passes up through at least some of the plurality of sieve plate apertures that are in fluid communication with the interior funnel space where the feed liquid contacts a solid chemical material residing within the interior funnel space so as to form the treated liquid, and at least a portion of the treated liquid passes through the funnel sidewall aperture and is removed from the housing through the outlet.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 through 6 like characters refer to the same components and/or streams, such as liquid streams, as the case may be, unless otherwise stated.

DETAILED DESCRIPTION

Figure 1:
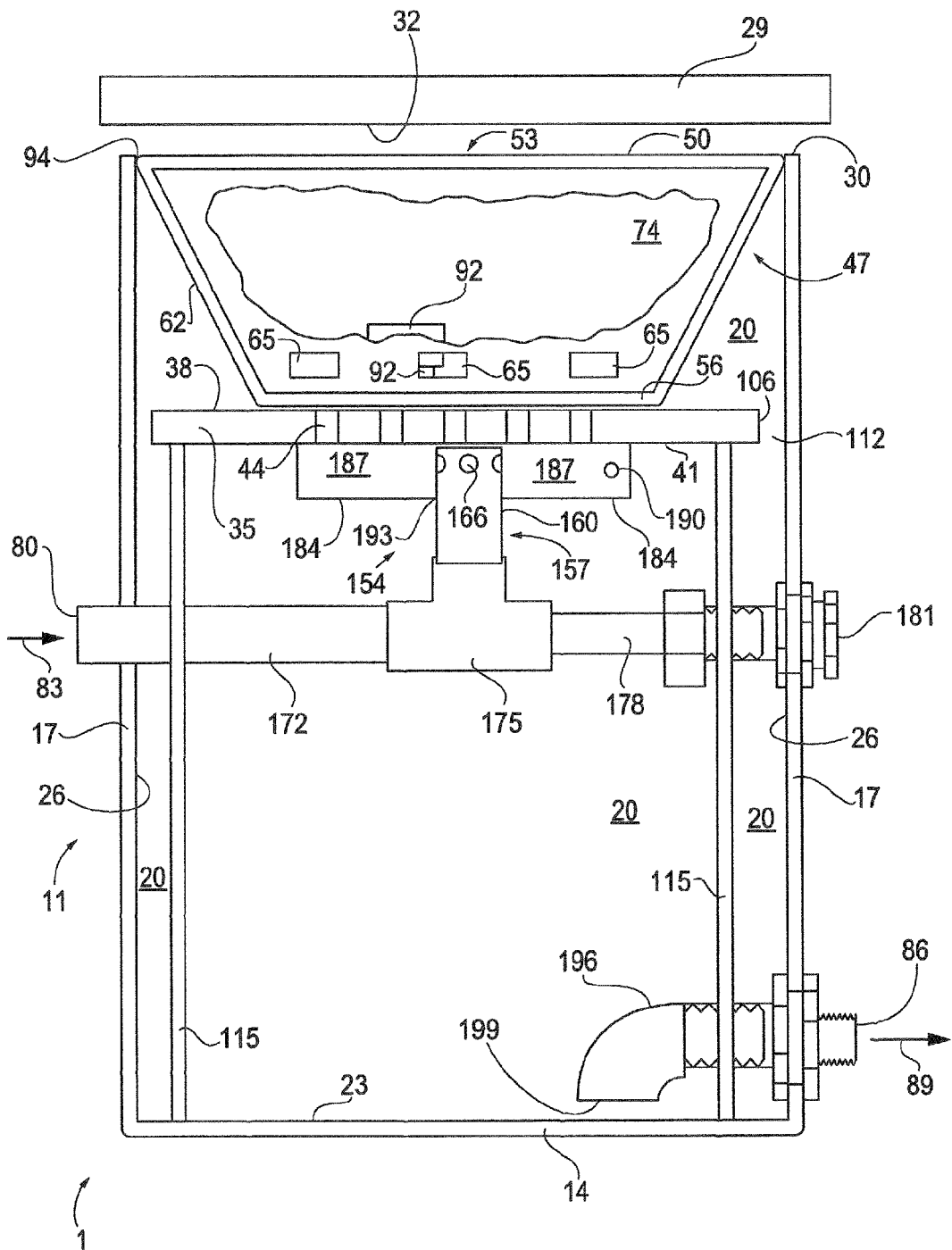
FIG. 1 is a representative partially exploded side elevational partial sectional view of a chemical feeder in accordance with some embodiments of the present invention, which includes a plurality of sieve plate support legs.

As used herein, the singular articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, quantities of ingredients, flow rates, pressures, and so forth used in the specification and claims are to be understood as modified in all instances by the term "about."

All documents, such as but not limited to issued patents and patent applications, referred to herein, and unless otherwise indicated, are to be considered to be "incorporated by reference" in their entirety.

As used herein, spatial or directional terms, such as "left", "right", "inner", "outer", "above", "below", "vertically", "upward", and the like, relate to embodiments of the invention as depicted in the drawing figures. However, it is to be understood that the invention can assume various alternative orientations and, accordingly, such terms are not to be considered as limiting.

With reference to FIG. 1 of the drawings, there is depicted a chemical feeder 1 according to some embodiments of the present invention. Chemical feeder 1 includes a housing 11 that includes a housing base 14 and a housing sidewall 17 that extends upward from housing base 14. Housing base 14 and housing sidewall 17 together define a housing chamber 20 that resides within housing 11. More particularly, housing base 14 has an inner surface 23, and sidewall 17 has an inner surface 26. Inner surface 23 of housing base 14 and inner surface 26 of sidewall 17 together define housing chamber 20, with some embodiments.

The housing of the chemical feeder includes a housing sidewall, such as housing sidewall 17. As used herein the term "a housing sidewall" means "at least one housing sidewall" that, with some embodiments, defines a housing sidewall structure, and correspondingly includes singular and plural referents thereof. With some embodiments, housing sidewall 17 is a unitary sidewall (or unitary sidewall structure). With some further embodiments, the housing sidewall is composed of two or more housing sidewalls (not depicted in the drawings).

Housing 11, with some embodiments, is a substantially cylindrical housing. Housing 11 can, with some further embodiments, have other shapes including, but not limited to, spherical and multi-sided shapes, such as, square-tubular, recta-tubular, hexa-tubular and octa-tubular. With some embodiments, the shape of housing chamber 20 defined by interior surfaces 23 and 26 can be different than the external shape of housing sidewall 17 and housing base 14. For purposes of non-limiting illustration, the exterior shape of housing sidewall 17 can be square, and housing base 14 can be square or circular, while interior surfaces 23 and 26 define a substantially cylindrical housing chamber 20.

Housing base 14 is affixed to the bottom of housing sidewall 17. With some embodiments, housing base 14 is attached to the bottom of housing sidewall 17 by art-recognized reversibly closeable systems, such as, matching threaded sections and/or fasteners (not shown). In accordance with some further embodiments, housing base 14 is attached to housing sidewall 17 by a substantially permanent system, such as by adhesives and/or welds. With some embodiments, housing base 14 and housing sidewall 17 together form (or are) a unitary housing base-housing sidewall structure.

Housing 11, with some embodiments, has a closed top. With some further embodiments, the top of housing 11 is closed with a lid, which can be reversibly closeable. As shown in a partially exploded side elevational view, chemical feeder 1 includes a lid 29 that is attached to a top or upper end 30 of housing sidewall 17. Lid 29 engages sealingly with the top/upper end 30 of housing sidewall 17, with some embodiments. Lid 29 can be attached to the top of housing sidewall 17 by art-recognized systems, which include, for example, bolts, clamps, and/or matching threaded sections (not shown). One or more gaskets (not shown) can be sealingly interposed between an inner surface 32 of lid 29 and the top 30 of housing sidewall 17, with some embodiments. The interior surface 32 of lid 29 together with the interior surfaces 26 and 23 of housing sidewall 17 and housing base 14, also serve to define housing chamber 20, with some embodiments.

With further reference to FIG. 1, chemical feeder 1 also includes a sieve plate 35, which has an upper surface 38, a lower surface 41, and a plurality of sieve plate apertures 44 that extend from lower surface 41 to upper surface 38 of sieve plate 35. Sieve plate 35 is positioned within housing chamber 20 and above the inner surface 23 of housing base 14.

The sieve plate can be supported within the housing chamber and above the inner surface of the housing base by systems including, but not limited to, a plurality sieve plate support legs and/or an inner sidewall, each of which are described in further detail herein.

Figure 3:
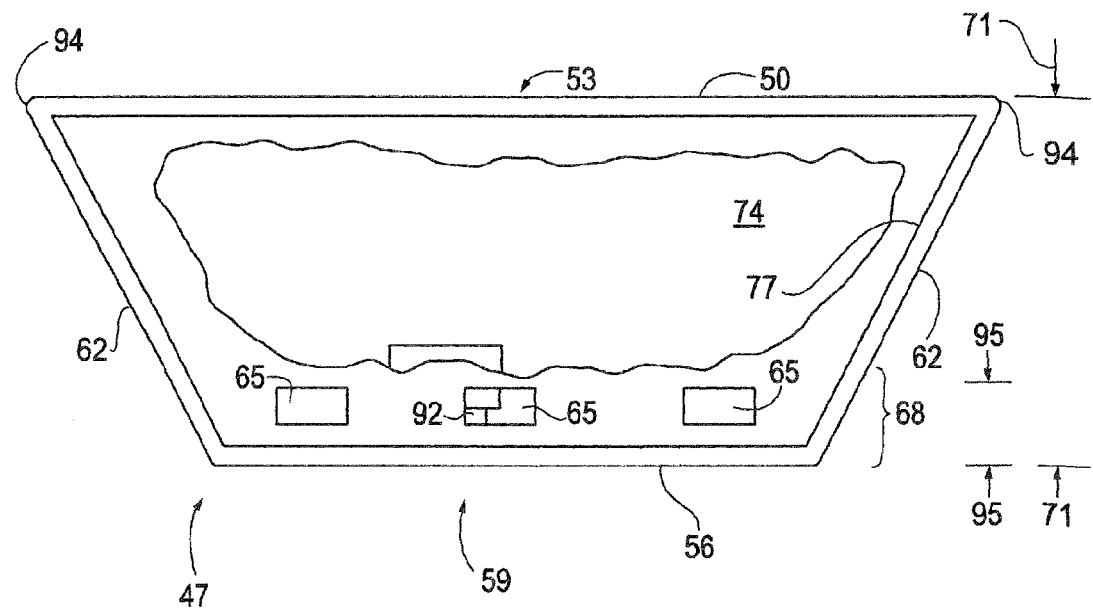
FIG. 3 is a representative side elevational and partially cutaway view of a funnel in accordance with some embodiments of the chemical feeder of the present invention.

With reference to FIGS. 1 and 3, the chemical feeder in accordance with the present invention further includes a funnel 47. Funnel 47 includes: an upper funnel end 50, which defines an upper funnel opening 53; a lower funnel end 56, which defines a lower funnel opening 59; and a funnel sidewall 62 that extends from upper funnel end 50 to lower funnel end 59. The upper funnel end can, with some embodiments, include an outwardly extending flange and/or an inwardly extending flange (not shown). The lower funnel end can, with some embodiments, include an outwardly extending flange and/or an inwardly extending flange (not shown).

The funnel of the chemical feeder includes a funnel sidewall, such as funnel sidewall 62. As used herein the term "a funnel sidewall" means "at least one funnel sidewall" that, with some embodiments, defines a funnel sidewall structure, and correspondingly includes singular and plural referents thereof. With some embodiments, funnel sidewall 62 is a unitary sidewall (or unitary sidewall structure). With some further embodiments, the funnel sidewall is composed of two or more funnel sidewalls (not depicted in the drawings).

In accordance with some embodiments, upper funnel opening 53 is larger than lower funnel opening 59. With some embodiments, the upper funnel opening and the lower funnel opening can each independently have a shape selected from circular shapes, elliptical shapes, polygonal shapes (e.g., triangular, rectangular, pentagonal, hexagonal, heptagonal, octagonal, etc.), irregular shapes, and combinations of two or more such shapes.

The upper funnel opening, with some embodiments, is substantially circular, and has a diameter of from 30 cm to 80 cm, or from 35 cm to 60 cm, or from 40 cm to 45 cm. The lower funnel opening, with some embodiments, is substantially circular, and has a diameter of from 15 cm to 41 cm, or from 18 cm to 31 cm, or from 20 cm to 25 cm. In accordance with some embodiments, the diameter of the upper funnel opening and the diameter of the lower funnel opening can in each case be independently selected from the above recited ranges, provided that the upper funnel opening is larger than the lower funnel opening, and correspondingly the lower funnel opening is smaller than the upper funnel opening.

Funnel sidewall 62, with some embodiments, includes at least one funnel sidewall aperture 65. Each funnel sidewall aperture 65 is located in a lower portion 68 of the funnel sidewall 62. With some embodiments, the upper limit (above which no funnel sidewall apertures are located) of the lower portion of the funnel sidewall 62 is less than 50 percent of the total height 71 of the funnel (as measured from the lower funnel end 56 to the upper funnel end 50), such as less than or equal to 40 percent of the total height 71, or less than or equal to 35 percent of the total height 71, or less than or equal to 30 percent of the total height 71, or less than or equal to 25 percent of the total height 71, or less than or equal to 25 percent of the total height 71. The upper limit (above which no funnel sidewall apertures are located) of the lower portion of the funnel sidewall 62 is, with some embodiments, greater than 0 percent of the total height 71, such as greater or equal to 5 percent of the total height 71, or greater than or equal to 7 percent of the total height 71, or greater than or equal to 10 percent of the total height 71.

With some embodiments, each funnel sidewall aperture independently: (i) is positioned wholly within funnel sidewall 62 (such as being defined by funnel sidewall 62, and as depicted in the drawings); and/or (ii) extends from funnel sidewall 62 to and/or through lower funnel end 56 (such as being defined by a combination of funnel sidewall 62 and lower funnel end 56—not depicted in the drawings).

Each funnel sidewall aperture, with some embodiments, has a shape independently selected from circular shapes, elliptical shapes, polygonal shapes (e.g., triangular, rectangular, pentagonal, hexagonal, heptagonal, octagonal, etc.), irregular shapes, and combinations of two or more such shapes.

In accordance with some embodiments, the funnel of the chemical feeder has a total height 71 (as measured from the lower funnel end 56 to the upper funnel end 50) of from 20 cm to 50 cm, or from 23 cm to 40 cm, or from 25 cm to 35 cm.

Funnel sidewall 62 defines an interior funnel space 74. More particularly, and in accordance with some embodiments, an inner surface 77 of funnel sidewall 62 defines interior funnel space 74. The interior funnel space, with some embodiments, has a volume of from 8300 $cm^3$ to 156,000 $cm^3$ (2 US gallons to 41 US gallons), or from 20,000 $cm^3$ to 73,000 $cm^3$ (5 US gallons to 19 US gallons), or from 26,000 $cm^3$ to 28,000 $cm^3$ (6.9 US gallons to 7.4 US gallons).

Funnel 47 is positioned within housing chamber 20. The lower funnel end 56 is positioned on upper surface 38 of sieve plate 35. At least some of the plurality of sieve plate apertures 44 are in fluid communication with the interior funnel space 74 through (or by way of) the lower funnel opening 59. As used herein, recitations with regard to the lower funnel end being positioned on the upper surface of the sieve plate, means that: (i) at least a portion of the lower funnel end and the upper surface of the sieve plate abut each other; and/or (ii) one or more other structures are interposed between the lower funnel end and the upper surface of the sieve plate (provided the lower funnel opening is not totally obstructed). Examples of other structures that can be interposed between the lower funnel end and the upper surface of the sieve plate include, but are not limited to, gaskets, spacers, and extensions (such as peg extensions) extending up from the upper surface of the sieve plate (not shown in the drawings). As depicted in the drawings, and in accordance with some embodiments, lower funnel end 56 and upper surface 38 of sieve plate 35 abut each other.

The funnel of the chemical feeder, in accordance with some embodiments, is a frustoconical funnel, such as depicted in the drawings. The funnel, with some further embodiments, includes a plurality of funnel sidewall apertures, such as at least two funnel sidewall apertures.

The chemical feeder, in accordance with some embodiments, further includes at least one inlet 80 in housing 11 through which a feed liquid (as depicted by arrow 83) is introduced into housing 11, such as into housing chamber 20. In accordance with some further embodiments, inlet 80 is positioned below sieve plate 35. Each inlet can be independently positioned in (or through) any appropriate portion or portions of housing 11, such as, but not limited to, in housing sidewall 17 and/or housing base 14. With some embodiments, and as depicted in the drawings, inlet 80 is in (or through) housing sidewall 17.

The chemical feeder, in accordance with some further embodiments of the present invention, includes at least one outlet 86 in housing 11 through which a treated liquid (as depicted by arrow 89) that includes dissolved chemical material is removed from housing 11, such as from housing chamber 20. Each outlet can be independently positioned in any appropriate portion or portions of housing 11, such as, but not limited to, in housing sidewall 17 and/or housing base 14. With some embodiments, and as depicted in the drawings, outlet 86 is positioned in (or through) housing sidewall 17.

The outlet is positioned below the sieve plate, with some embodiments. For purposes of non-limiting illustration and with reference to FIG. 1, outlet 86 is positioned below sieve plate 35, and more particularly, below lower surface 41 of sieve plate 35. With some embodiments, the chemical feeder includes a standpipe (not shown) residing within housing chamber 20, and which is in fluid communication with outlet 86. The upper end of the standpipe is, with some embodiments, positioned above outlet 86 and below lower surface 41 of sieve plate 35.

In accordance with some embodiments and with reference to FIG. 1, outlet 86 is in fluid communication with an outlet pipe 196 that resides within housing chamber 20. Outlet pipe 196 includes an opening 199 that is in fluid communication with housing chamber 20. With some embodiments, opening 199 of outlet pipe 196 is in facing opposition relative to inner surface 23 of housing base 14.

Figure 2:
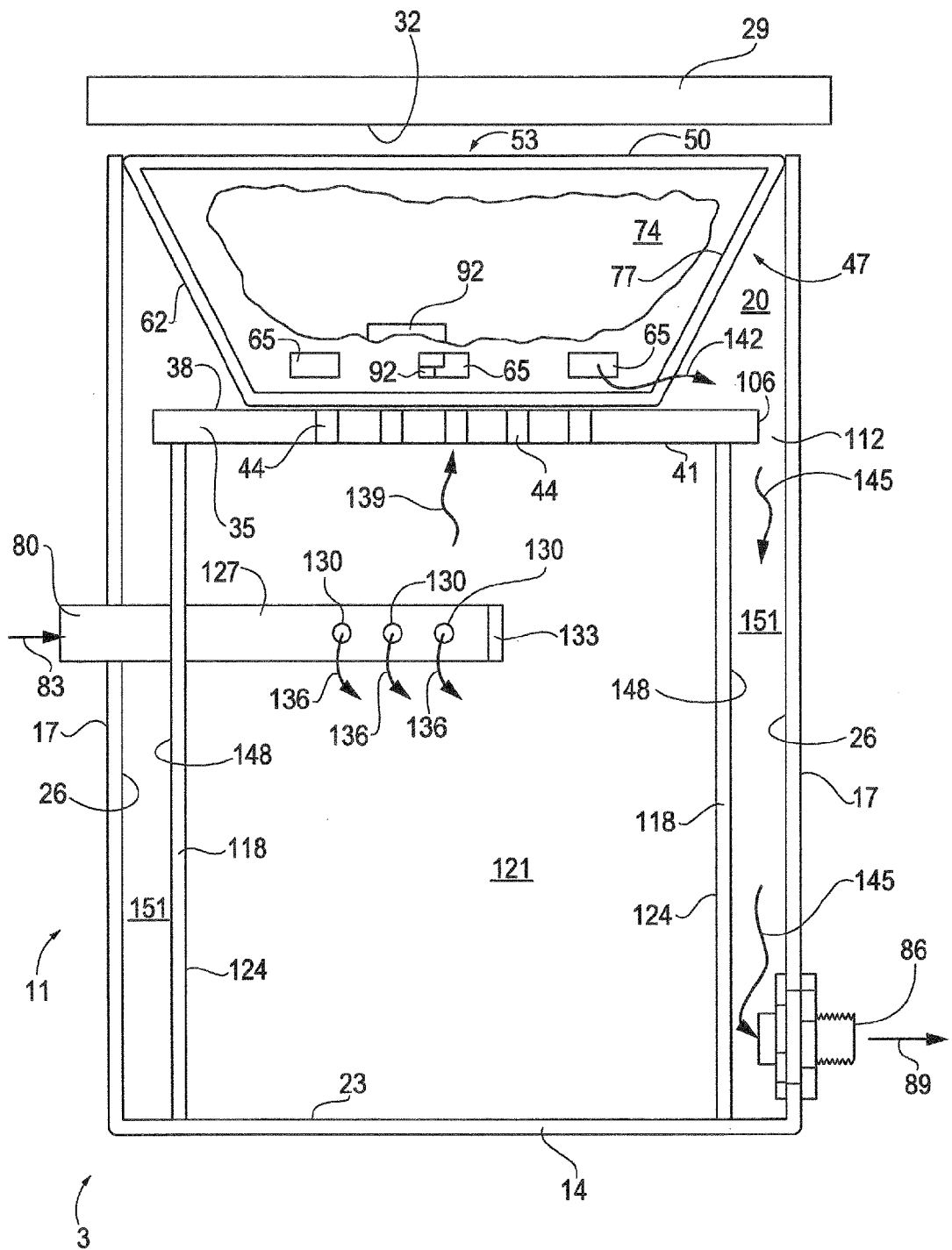
FIG. 2 is a representative partially exploded side elevational partial sectional view of a chemical feeder in accordance with some embodiments of the present invention, which includes an inner sidewall.

During operation of the chemical feeder, and in accordance with some embodiments, at least some of the feed liquid introduced into housing 11, such as into housing chamber 20, passes up through at least some of the plurality of sieve plate apertures 44 that are in fluid communication with interior funnel space 74, where the feed liquid contacts a solid chemical material 92 residing within interior funnel space 74. The solid chemical material 92 as depicted in FIGS. 1 and 2 is in the form of tablets, of which a portion of two tablets are shown (for ease of depiction). With some embodiments, a plurality of tablets are present in interior funnel space 74, from lower funnel end 56 and substantially up to upper funnel end 50 (not depicted in the drawings). The solid chemical material can, with some embodiments, be in the form of granules, pellets, and/or tablets. With some embodiments, the size, shape, and/or form, of the solid chemical material is selected such that it will not fall down through or otherwise clog one or more sieve plate apertures. The solid chemical materials that can be used with the chemical feeders of the present invention are discussed in further detail herein.

Contact of feed liquid with solid chemical material 92 within interior funnel space 74 results in the formation of a treated liquid that includes dissolved chemical material, with some embodiments. At least a portion of the treated liquid passes through at least some of the funnel sidewall apertures 65, and is removed from housing 11 through outlet 86, as indicated by arrow 89.

In accordance with some embodiments, and during operation of the chemical feeder, interior funnel space 74 is substantially free of a liquid level, such as formed from the feed liquid and/or treated liquid, that resides above the upper limit of the funnel sidewall aperture(s). For purposes of non-limiting illustration, and with reference to FIG. 3, funnel sidewall apertures 65 have an upper limit 95 (or distance) above lower funnel end 56. The liquid level (not shown) within interior funnel space 74 (such as formed from the feed liquid and/or treated liquid), with some embodiments, does not extend above upper limit 95 of funnel sidewall apertures 65. Maintaining the liquid level at or below upper limit 95 exposes only chemical material residing below upper limit 95 to the liquid (such as by immersion or soaking exposure), with some embodiments. Correspondingly, solid chemical material residing above upper limit 95 is substantially free of exposure to the feed liquid/treated liquid (such as by immersion or soaking exposure), with some embodiments. Further correspondingly, maintaining the liquid level at or below upper limit 95 serves to control the rate at which solid chemical material within interior funnel space 74 is dissolved, the rate at which treated liquid is formed, and can extend the lifetime of the solid chemical material residing within the whole of interior funnel space 74, with some embodiments. Extending the lifetime of solid chemical material residing within interior funnel space 74 can, with some embodiments, extend the period of time between required periodic charging of fresh/new solid chemical material to interior funnel space 74.

The chemical feeder, with some embodiments of the present invention, is free of solid chemical material residing outside of interior funnel space 74.

At least a portion of an outer edge of the upper funnel end abuts an interior surface of the housing sidewall, with some embodiments. For purposes of non-limiting illustration and with reference to FIGS. 1 and 3, upper funnel end 50 of funnel 47 has an outer edge 94. Outer edge 94 of upper funnel end 50, with some embodiments, abuts inner surface 26 of housing sidewall 17 of housing 11. Abutment between outer edge 94 of upper funnel end 50 and inner surface 26 of housing sidewall 17 can be a sealing abutment (such as through which liquid does not pass) or a non-sealing abutment (such as through which liquid can pass).

At least a portion of outer edge 94 of upper funnel end 50, with some embodiments, is separated from inner surface 26 of housing sidewall 17 (not depicted in the drawings). The separation between outer edge 94 of upper funnel end 50 and inner surface 26 of housing sidewall 17 is selected, with some embodiments, so as to be less than the smallest dimension of the solid chemical material charged to interior funnel space 74, which minimizes or eliminates solid chemical material residing outside of interior funnel space 74, with some embodiments.

The chemical feeder, with some embodiments, further includes a lid that is reversibly attached to an upper end of the housing sidewall, and at least a portion of the upper funnel end abuts an inner surface of the lid. For purposes of non-limiting illustration and with reference to FIG. 1, chemical feeder 1 includes a lid 29 that is (depicted in a partially exploded view) reversibly attached to upper portion 30 of housing sidewall 17. With some embodiments, upper end 50 of funnel 47 abuts inner surface 32 of lid 29. Abutment between upper end 50 of funnel 47 and inner surface 32 of lid 29 can, with some embodiments, be a sealing abutment (such as through which liquid does not pass) or a non-sealing abutment (such as through which liquid can pass).

With some embodiments, upper end 50 of funnel 47 and inner surface 32 of lid 29 are spaced from each other and are substantially free of abutment there-between (not depicted in the drawings). The space between upper end 50 of funnel 47 and inner surface 32 of lid 29 is selected, with some embodiments, so as to be less than the smallest dimension of the solid chemical material residing within interior funnel space 74, which minimizes or eliminates solid chemical material residing outside of interior funnel space 74.

The lower funnel opening of the funnel, with some embodiments of the chemical feeder of the present invention, defines a first surface area on the upper surface of the sieve plate, the plurality of sieve plate apertures all reside within the first surface area and are in fluid communication with the interior funnel space, and the first surface area is less than a total surface area of the upper surface of said sieve plate. For purposes of non-limiting illustration and with reference to FIG. 4, lower funnel opening 59 of funnel 47 defines a first surface area 97 on upper surface 38 of sieve plate 35, and the plurality of sieve plate apertures 44 all reside within first surface area 97. The plurality of sieve plate apertures 44 residing within first surface area 97 are in fluid communication with interior funnel space 74 (see FIG. 1). First surface area 97 is less than a total surface area 100 of upper surface 38 of sieve plate 35, with some embodiments.

Figure 4:
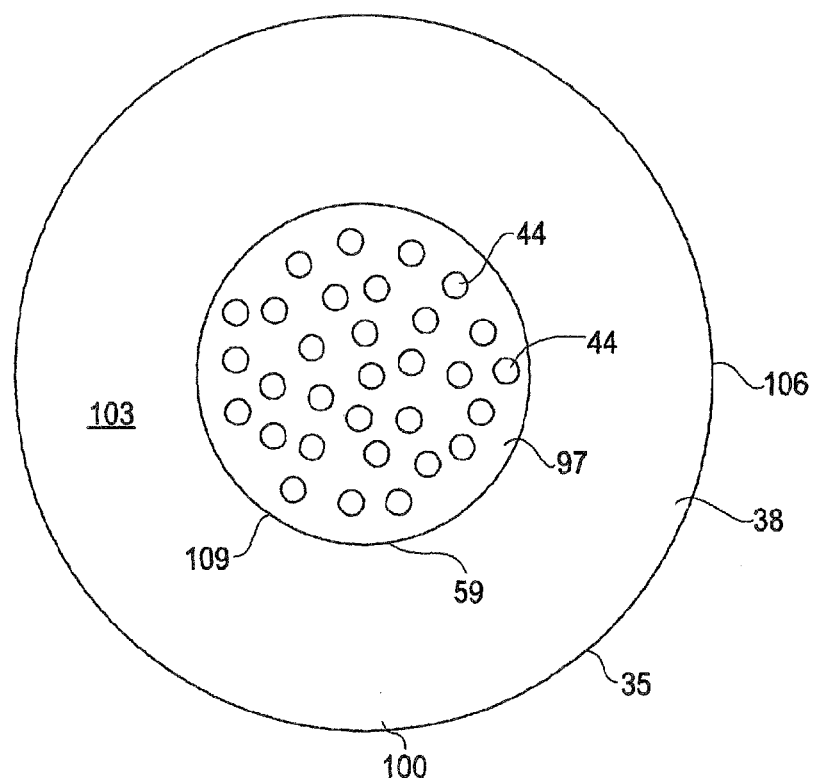
FIG. 4 is a representative top plan view of a sieve plate according to some embodiments of the present invention, in which the plurality of sieve plate apertures all reside within a first surface area that is defined by the lower funnel opening of the funnel.

In accordance with some embodiments, and with further reference to FIG. 4, upper surface 38 of sieve plate 35 has a second surface area 103 that resides outside of (or beyond) first surface area 97 and extends to outer sieve plate edge 106. Second surface area 103 of upper surface 38 of sieve plate 35 is, with some embodiments, an annular surface area that is defined by the outer perimeter 109 of lower funnel opening 59 and outer sieve plate edge 106. Second surface area 103 of upper surface 38 of sieve plate 35 is, with some embodiments, free of sieve plate apertures 44.

The sieve plate, with some embodiments, has an outer sieve plate edge, and the outer sieve plate edge is spaced from an inner surface of the housing sidewall, the outer sieve plate edge and the inner surface of the housing sidewall together define a sieve plate annular space, the sieve plate annular space is in fluid communication with the outlet (of the housing), and at least a portion of the treated liquid passes through the sieve plate annular space. With reference to FIG. 1, and for purposes of non-limiting illustration, outer sieve plate edge 106 and inner surface 26 of housing sidewall 17 together define a sieve plate annular space 112.

Sieve plate annular space 112 is in fluid communication with outlet 86 of housing 11. Treated liquid formed within interior funnel space 74 passes out through funnel sidewall aperture(s) 65, across upper surface 38 of sieve plate 35 (such as across second surface area 103 of upper surface 38 of sieve plate 35, FIG. 4), drops/passes down through sieve plate annular space 112, and passes out of housing 11 through outlet 86, as indicated by arrow 89, with some embodiments.

The sieve plate, with some embodiments, includes a plurality of sieve plate support legs, in which each sieve plate support leg extends from an inner surface of the housing base to the lower surface of the sieve plate. With reference to FIG. 1, and for purposes of non-limiting illustration, sieve plate 35 includes a plurality of sieve plate support legs 115. Each sieve plate support leg 115 extends from inner surface 23 of housing base 14 to lower surface 41 of sieve plate 35. Sieve plate 35 is maintained in position above inner surface 23 of housing base 14 at least in part by sieve plate support legs 115, with some embodiments. The sieve plate can include any suitable number of sieve plate support legs, such as at least 2, at least 3, at least 4, or at least 5 sieve plate support legs. For ease of illustration, only two sieve plate support legs 115 are depicted in FIG. 1. With some embodiments, the sieve plate includes three sieve plate support legs.

The chemical feeder, with some embodiments of the present invention, further includes an inner sidewall that resides within the housing chamber, the inner sidewall extends from an inner surface of the housing base to the lower surface of the sieve plate, the inner sidewall supports the sieve plate and defines an inner chamber that resides below the sieve plate. The inlet of the housing is in fluid communication with the inner chamber, and the inner chamber is in fluid communication with at least some of the plurality of sieve plate apertures that are in fluid communication with the interior funnel space.

With non-limiting reference to FIG. 2, and for purposes of illustration, chemical feeder 3 includes an inner sidewall 118 that resides within housing chamber 20. Inner sidewall 118 extends from inner surface 23 of housing base 14 to lower surface 41 of sieve plate 35. Inner sidewall 118 supports sieve plate 35 and defines an inner chamber 121 that resides below sieve plate 35. With some embodiments, inner surface 124 of inner sidewall 118, inner surface 23 of housing base 14, and lower surface 41 of sieve plate together define inner chamber 121.

With further reference to FIG. 2 and in accordance with some embodiments, inlet 80 of housing 11 is in fluid communication with inner chamber 121, inner chamber 121 is in fluid communication with at least some of the plurality of sieve plate apertures 44, that are themselves in fluid communication with interior funnel space 74. With further reference to FIG. 2, and in accordance with some embodiments, inlet 80 is in fluid communication with an inlet pipe 127 that extends through inner sidewall 118 and into inner chamber 121. Inlet pipe includes a plurality of inlet pipe apertures 130. Inlet pipe 127, with some embodiments, includes a terminal plug 133.

An exterior surface of the inner sidewall and an inner surface of the housing sidewall together define an annular chamber, with some embodiments, the funnel sidewall aperture is in fluid communication with the annular chamber, and the annular chamber is in fluid communication with the outlet of the housing. With reference to FIG. 2, exterior surface 148 of inner sidewall 118 and inner surface 26 of housing sidewall 17 together define annular chamber 151. Each funnel sidewall aperture 65 is in fluid communication with annular chamber 151, and annular chamber 151 is in fluid communication with outlet 86 of housing 11.

In accordance with some embodiments, and with further reference to FIG. 2, feed liquid (as indicated by arrow 83) is introduced into housing 11 through inlet 80, passes through inlet pipe 127, out through inlet pipe apertures 130, and into inner chamber 121, as indicated by arcuate arrows 136. The feed liquid then passes from inner chamber 121 up through at least some of sieve plate apertures 44 (as indicated by serpentine arrow 139) and into interior funnel space 74. Within interior funnel space 74, the feed liquid contacts solid chemical material 92 and forms a treated liquid (that includes dissolved chemical material). At least some of the treated liquid passes out of interior funnel space 74 through funnel sidewall apertures 65, as indicated by serpentine arrow 142. The treated liquid then passes through sieve plate annular space 112, down through annular chamber 151 (as indicated by serpentine arrows 145) and out of housing 11 through outlet 86, as indicated by arrow 89.

The chemical feeder, in accordance with some embodiments, includes a nozzle that is in fluid communication with the inlet of the housing. The nozzle includes a distributor head that includes a distributor head sidewall and a dome. With the distributor head, and according to some embodiments: (i) the distributor head sidewall includes at least one distributor head aperture; and/or (ii) the dome includes at least one dome hole. The nozzle, with some embodiments, extends upward towards the lower surface of the sieve plate, and the feed liquid introduced through the inlet of the housing passes through the nozzle, through and out of the distributor head (via the distributor head aperture(s) and/or the dome hole(s)), up through at least some of the sieve plate apertures that are in fluid communication with the interior funnel space, and into the interior funnel space.

Figure 5:
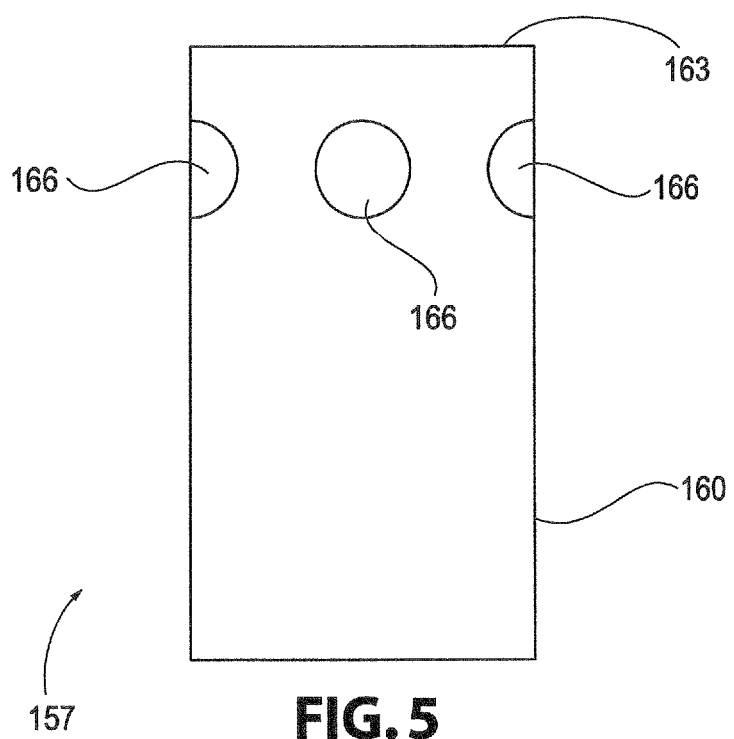
FIG. 5 is a representative side elevational view of a distributor head of a nozzle of a chemical feeder in accordance with some embodiments of the present invention.
Figure 6:
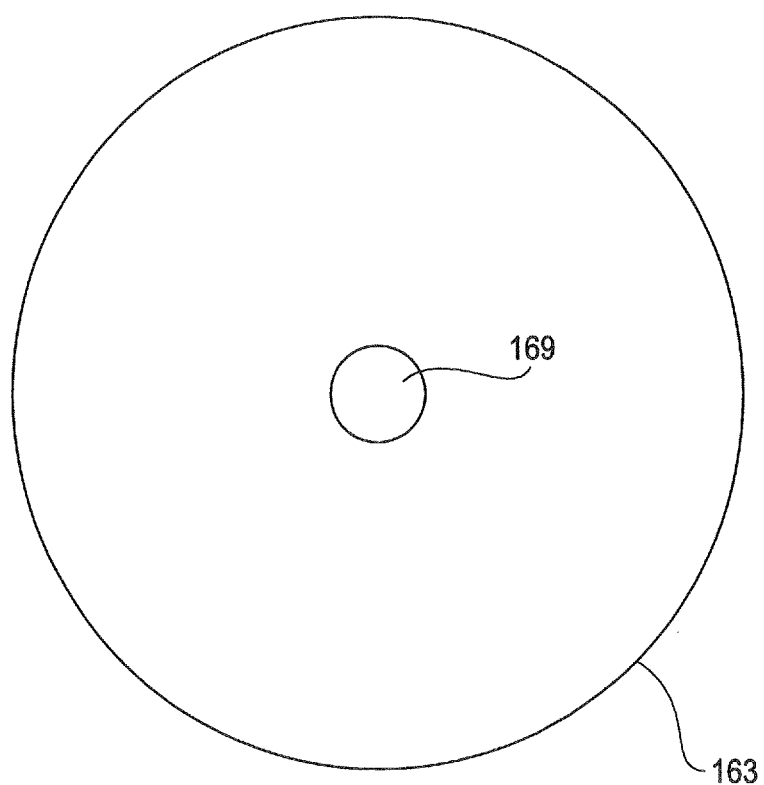
FIG. 6 is a representative top plan view of the dome of a distributor head, in accordance with some embodiments, which includes a dome hole.

For purposes of non-limiting illustration, and with reference to FIGS. 1, 5, and 6, chemical feeder 1 includes a nozzle 154 that is in fluid communication with inlet 80 of housing 11. Nozzle 154 includes a distributor head 157. Distributor head 157 includes a distributor head sidewall 160 and a dome 163. With distributor head 157: (i) distributor head sidewall 160 includes at least one distributor head aperture 166; and/or (ii) dome 163 includes at least one dome hole 169. Nozzle 154, with some embodiments, extends upward towards lower surface 41 of sieve plate 35, and the feed liquid introduced through inlet 80 of housing 11 passes through nozzle 154, through and out of distributor head 157 (via distributor head aperture(s) 166 and/or dome hole(s) 169), up through at least some of the sieve plate apertures 44 that are in fluid communication with interior funnel space 74, and into interior funnel space 74.

As used herein the term "a distributor head sidewall" means "at least one distributor head sidewall" that, with some embodiments, defines a distributor head sidewall structure, and correspondingly includes singular and plural referents thereof. With some embodiments, the distributor head sidewall is a unitary distributor head sidewall (or a unitary distributor head sidewall structure). With some further embodiments, the distributor head sidewall is composed of two or more distributor head sidewalls (not depicted in the drawings).

With further reference to FIG. 1, and in accordance with some embodiments, inlet 80 of housing 11 is in fluid communication with inlet pipe 172, which is in fluid communication with T-fitting 175. T-fitting 175 is in fluid communication with nozzle 154. T-fitting 175 is also connected to an extension 178 that extends through housing sidewall 17. Extension 178 includes, with some embodiments, an extension plug 181, which prevents liquid from exiting housing 11 through extension 178. With some embodiments, extension 178 serves to support and stabilize nozzle 154 beneath sieve plate 35.

In accordance with some embodiments of the present invention, the chemical feeder includes a nozzle as described above, and the lower funnel opening defines a first surface area on the upper surface of the sieve plate, the plurality of sieve plate apertures all reside within the first surface area and are in fluid communication with the interior funnel space, and the first surface area is less than a total surface area of the upper surface of the sieve plate. The chemical feeder further includes, a collection casing attached to the lower surface of the sieve plate, in which the collection casing includes a collection casing chamber that is in fluid communication with the plurality of sieve plate apertures (that reside within the first surface area). The distributor head (of the nozzle) resides within the collection casing chamber, and: (i) the distributor head aperture; and/or (ii) the dome hole, are in fluid communication with the collection casing chamber.

The first surface area (such as first surface area 97), the total surface area (such as total surface area 100), and the related second/annular surface area (such as second surface area 103) of the upper surface 38 of sieve plate 35 are each, with some embodiments, as described previously herein with reference to FIG. 4. With reference to FIG. 1, chemical feeder 1 further includes, with some embodiments, a collection casing 184, which is attached to lower surface 41 of sieve plate 35. Collection casing 184 includes a collection casing chamber 187 that is in fluid communication with the plurality of sieve plate apertures 44, which all (or each) reside within first surface area 97. Distributor head 157 resides within (or a portion of distributor head 157 extends into) collection casing chamber, such that: (i) the distributor head aperture(s) 166; and/or (ii) the dome hole(s) 169, are in fluid communication with collection casing chamber 187.

With further reference to FIG. 1, for purposes of non-limiting illustration, and in accordance with some embodiments, feed liquid (as indicated by arrow 83) is introduced into housing 11 through inlet 80. The feed liquid passes through inlet pipe 172, T-fitting 175, up through nozzle 154, and into distributor head 157. The feed liquid exits distributor head 157 through: (i) distributor head aperture(s) 166; and/or (ii) dome hole 169. The feed liquid, with some embodiments, enters collection casing chamber 187 of collection casing 184, passes up through sieve plate apertures 44, and into interior funnel space 74 where it contacts solid chemical material 92, and so forms a treated liquid that includes dissolved chemical material. The treated liquid passes out of interior funnel space 74 through funnel sidewall aperture(s) 65, down through sieve plate annular space 112 and out of housing 11 through outlet 86 (as indicated by arrow 89). Collection casing 184, with some embodiments, serves to collect the feed liquid passing out of distributor head 157 in collection casing chamber 187, and directs the feed liquid collected in collection chamber 187 up through sieve plate apertures 44 and into interior funnel space 74.

The distributor head (or a portion of the distributor head), with some embodiments, resides sealingly within the collection casing chamber. With further reference to FIG. 1, the portion (such as the upper portion) of distributor head 157, which includes (i) distributor head aperture(s) 166 and/or (ii) dome hole(s) 169, resides sealingly within collection casing chamber 187. Distributor head 157, with some embodiments, extends sealingly into collection casing chamber 187 through a collection casing hole 193. A gasket (not shown) can, with some embodiments, be positioned sealingly between collection casing hole 193 and distributor head sidewall 160.

With some embodiments, the collection casing includes at least one collection casing aperture that is in fluid communication with the housing chamber. With reference to FIG. 1, collection casing 184 includes a collection casing aperture 190 that provides fluid communication between the collection casing chamber 187 and housing chamber 20.

The flow of feed liquid into the housing can be adjusted (such as turned on and off) manually and/or automatically, using mechanical and/or electronic systems, with some embodiments. The flow of feed liquid into the housing is, with some embodiments, controlled relative to the liquid level within the housing, such as within the housing chamber. With some embodiments, when the liquid level in the housing chamber, below the sieve plate: (i) drops below a predetermined level, feed liquid is introduced into the housing chamber; and (ii) rises above the predetermined level, the introduction of feed liquid into the housing chamber is stopped. In accordance with some embodiments, and with non-limiting reference to FIG. 1, inlet 80 or inlet pipe 172 includes an inlet valve (not shown) that is controllably coupled to a float (not shown) that resides within housing chamber 20 below sieve plate 35. The float rises and falls with the level of liquid (not shown) in housing chamber 20 below sieve plate 35. When the float rises (with the liquid level) above a predetermined level, the inlet valve is closed, and the flow of feed liquid into housing chamber 20 (such as into collection casing 184) is stopped, with some embodiments. When the float falls or drops (with the liquid level) below the predetermined level, the inlet valve is opened and feed liquid flows into housing chamber 20 (such as into collection casing 184).

The chemical feeders of the present invention and the various components thereof, such as, but not limited to, the housing, sieve plate, sieve plate support legs, inner sidewall, funnel, nozzle, distributor head, and collection casing, can each be independently fabricated from any suitable material or combination of materials that are chemically and/or corrosion resistant to the solid chemical material and fluids (or liquids) used. Examples of suitable fabrication materials include, but are not limited to, polyethylene, ABS (acrylonitrile-butadiene-styrene resin), fiberglass reinforced resins, polystyrene, polypropylene, poly(vinyl chloride), chlorinated poly(vinyl chloride) or any other appropriate material(s) that is chemically resistant to the solid chemical being dispensed, such as a sanitizing agent, such as calcium hypochlorite. Other materials such as stainless steel can additionally or alternatively be used, but the use of such material would result in a significant increase in cost of the chemical feeder. With some embodiments, one or more components of the chemical feeder, such as the housing, is fabricated from poly(vinyl chloride) (PVC), which is generally chemically resistant to water sanitizing chemicals, such as calcium hypochlorite. In accordance with some further embodiments of the present invention: at least a portion of the housing sidewall (such as housing sidewall 17); the lid (such as lid 29); and/or the funnel (such as funnel 47), are each fabricated from transparent PVC, which allows for visual inspection of the amount of solid chemical material present in the funnel (such as funnel 47) without opening the housing. Plastic parts of the chemical feeder can be fabricated by art-recognized methods including, but not limited to, injection molding and rotational molding.

When constructed of plastic resin material, the various parts of the chemical feeder can, with some embodiments, be joined by solvent or heat welding or by threading. If a metal, such as stainless steel is used, conventional metal welding of the parts can be used to fabricate the chemical feeder. Alternatively, the various parts of the chemical feeder can be joined by conventional threaded bolts and appropriate gasketing to ensure that the chemical feeder is sealed, such as being liquid-tight, such as water-tight. Inlet 80 and outlet 86 of housing 11 can, with some embodiments, be joined to feed and removal conduits (not shown) by, for example, matched threaded sections, quick release fittings, plastic welding, and/or adhesives (not shown).

The various gaskets or seals, such as annular gaskets associated with the lid, used in the chemical feeder are, with some embodiments, fabricated from resilient materials that are resistant to the solid chemical materials and liquids used. Examples of materials from which the gaskets can be fabricated include, but are not limited to, rubber, such as natural rubber, styrene-butadiene rubber, neoprene rubber and silicone rubber; and fluorinated materials, such as homopolymers and copolymers of tetrafluoroethylene and chlorotrifluoroethylene, and copolymers of vinylidene fluoride and hexafluoropropylene.

The solid chemical material, or treating agent, used with the chemical feeders of the present invention can be any chemical that is solid at ambient (or standard) conditions of temperature and pressure (STP), and which is readily soluble in the liquid, such as water, that is introduced into the chemical feeder, at STP conditions. With some further embodiments, the solid chemical material is capable of being formed into pellets or tablets. The solid chemical material, with some further embodiments, is in the form of tablets that have a diameter which is greater than the diameter of the sieve plate apertures, such as sieve plate apertures 44. Examples of such solid chemical materials, include, but are not limited to: sanitizing agents, such as chemicals that sanitize water, such as calcium hypochlorite, bromo-chloro hydantoins (such as, 1-bromo-3-chloro-5,5-dimethylhydantoin), dichlorohydantoins and chloroisocyanurates; dechlorination agents such as sodium sulfite, sodium metabisulfite, sodium bisulfite, sodium thiosulfate, sodium hydrosulfide (NaSH), and sodium sulfide ($Na_2S$); pH control agents such as sodium bisulfate, citric acid, sodium carbonate, and sodium bicarbonate; and algecides or antibacterial agents, such as quaternary ammonium compounds.

The chemical feeder of the present invention can, with some embodiments, be integrated into fluid, such as water, treatment operations by appropriate piping connected with inlet 80 and outlet 86. The chemical feeder can be integrated into, for example: a single pass system, such as an aqueous stream used to sanitize the surface of an article, such as vegetables, such as potatoes or surfaces used in the handling or processing of food; or a closed loop system, such as a swimming pool or hot tub. With some embodiments, the chemical feeder via inlet 80 and outlet 86, is connected directly (such as in-line) with the main fluid conduit used to recycle and treat a fluid, such as water, from a stationary body of fluid, such as a swimming pool. Further examples of single pass systems into which the chemical feeder of the present invention can, with some embodiments, be integrated, include, but are not limited to: single pass systems from which drinking water is produced; and wastewater treatment systems.

The present invention also relates to a method of treating a body of liquid comprising: (a) providing the chemical feeder of the present invention as described previously herein; (b) drawing a feed liquid from the body of liquid; (c) introducing the feed liquid into the inlet of the chemical feeder; (d) removing a treated liquid from the outlet of the chemical feeder; and (e) introducing at least a portion of the treated liquid into the body of liquid. In accordance with some embodiments, steps (b) through (e) are performed continuously.

The present invention further relates to a method of treating, such as sanitizing, a body of liquid, such as a body of water, such as a swimming pool. The liquid treating method comprises: (a) providing a chemical feeder as described previously herein, wherein the interior funnel space contains solid chemical material; (b) introducing, optionally under elevated pressure, a liquid stream (such as an aqueous stream) drawn from a body of liquid (such as a body of water) into the inlet of the chemical feeder; (c) removing a treated liquid stream (such as a treated aqueous stream) containing dissolved treating material (such as dissolved sanitizing material) from the outlet of the chemical feeder; and (d) introducing at least a portion of the treated liquid stream into the body of liquid. Steps (b) through (d) are performed continuously, with some embodiments.

With some embodiments of the method of the present invention, the inlet of the chemical feeder is connected directly in-line with a main water conduit used to handle water withdrawn from a body of water. In this configuration, the outlet of the pump used to recycle the water is in direct fluid communication (by way of a suitable conduit) with the inlet of the chemical feeder, in which case the chemical feeder is located on the pressure side of the recycle pump. The pressure of the liquid stream (such as an aqueous stream) introduced into the inlet of the chemical feeder can vary widely, and is with some embodiments from 5 pounds per square inch (psi) (34 kilopascals) to 15 psi (103 kilopascals), or from 5 psi to 10 psi (69 kilopascals). The flow rate of the liquid stream (such as an aqueous stream) through the chemical feeder can also vary widely, and is, with some embodiments, from 2 to 100 gallons per minute (7.6 to 379 liters per minute), or from 5 to 75 gallons per minute (19 to 284 liters per minute), or from 10 to 50 gallons per minute (38 to 189 liters per minute).

The present invention has been described with reference to specific details of particular embodiments thereof. It is not intended that such details be regarded as limitations upon the scope of the invention except insofar as and to the extent that they are included in the accompanying claims.

What is claimed is:

1. A chemical feeder comprising:
 (a) a housing having a housing base and a housing sidewall that together define a housing chamber within said housing;
 (b) a sieve plate having an upper surface, a lower surface, and a plurality of sieve plate apertures extending from said lower surface to said upper surface of said sieve plate, wherein said sieve plate is positioned within said housing chamber and above an inner surface of said housing base;
 (c) a funnel comprising an upper funnel end defining an upper funnel opening, a lower funnel end defining a lower funnel opening, and a funnel sidewall extending from said upper funnel end to said lower funnel end, wherein said upper funnel opening is larger than said lower funnel opening, said funnel sidewall comprises at least one funnel sidewall aperture located in a lower portion of said funnel sidewall, said funnel sidewall defines an interior funnel space, said funnel is positioned within said housing chamber, said lower funnel end is positioned on said upper surface of said sieve plate, and at least some of said plurality of sieve plate apertures are in fluid communication with said interior funnel space through said lower funnel opening;

(d) at least one inlet in said housing through which a feed liquid is introduced into said housing, said inlet being positioned below said sieve plate; and (e) at least one outlet in said housing through which a treated liquid comprising dissolved chemical material is removed from said housing, wherein at least some of said feed liquid introduced into said housing chamber through said inlet passes up through at least some of said plurality of sieve plate apertures that are in fluid communication with said interior funnel space where said feed liquid contacts a solid chemical material residing within said interior funnel space so as to form said treated liquid, and at least a portion of said treated liquid passes through said funnel sidewall aperture and is removed from said housing through said outlet, wherein a surface area of the lower funnel opening of the funnel is less than a surface area of the upper surface of the sieve plate, and wherein said sieve plate has an outer sieve plate edge, and said outer sieve plate edge is spaced from an inner surface of said housing sidewall, said outer sieve plate edge and said inner surface of said housing sidewall together defining a sieve plate annular space, said sieve plate annular space being in fluid communication with said outlet, and at least a portion of said treated liquid passes through said sieve plate annular space.

2. The chemical feeder of claim 1, wherein said funnel is a frustoconical funnel.

3. The chemical feeder of claim 1, wherein said funnel comprises a plurality of funnel sidewall apertures.

4. The chemical feeder of claim 1, wherein at least a portion of an outer edge of said upper funnel end abuts an interior surface of said housing sidewall.

5. The chemical feeder of claim 1, further comprising a lid reversibly attached to an upper end of said housing sidewall, wherein at least a portion of said upper funnel end abuts an inner surface of said lid.

6. The chemical feeder of claim 1, wherein said outlet is positioned below said sieve plate.

7. The chemical feeder of claim 1, wherein said lower funnel opening defines a first surface area on said upper surface of said sieve plate, said plurality of sieve plate apertures all reside within said first surface area and are in fluid communication with said interior funnel space, and said first surface area is less than a total surface area of said upper surface of said sieve plate.

8. The chemical feeder of claim 1, wherein said sieve plate comprises a plurality of sieve plate support legs, each sieve plate support leg extending from an inner surface of said housing base to said lower surface of said sieve plate.

9. The chemical feeder of claim 1 further comprising an inner sidewall residing within said housing chamber, said inner sidewall extending from an inner surface of said housing base to said lower surface of said sieve plate, said inner sidewall supporting said sieve plate and defining an inner chamber residing below said sieve plate, wherein said inlet is in fluid communication with said inner chamber, and said inner chamber is in fluid communication with at least some of said plurality of sieve plate apertures.

10. The chemical feeder of claim 9, wherein an exterior surface of said inner sidewall and an inner surface of said housing sidewall together define an annular chamber, said funnel sidewall aperture being in fluid communication with said annular chamber, and said annular chamber being in fluid communication with said outlet.

11. The chemical feeder of claim 1 further comprising,
a nozzle that is in fluid communication with said inlet, said nozzle comprising a distributor head comprising a distributor head sidewall and a dome, wherein at least one of,
(i) said distributor head sidewall comprises at least one distributor head aperture, and
(ii) said dome comprises at least one dome hole,
wherein said nozzle extends upward towards said lower surface of said sieve plate, and said feed liquid introduced through said inlet passes through said nozzle, through said distributor head, and up through at least some of said sieve plate apertures that are in fluid communication with said interior funnel space.

12. The chemical feeder of claim 11 wherein,
said lower funnel opening defines a first surface area on said upper surface of said sieve plate, said plurality of sieve plate apertures all reside within said first surface area and are in fluid communication with said interior funnel space, and said first surface area is less than a total surface area of said upper surface of said sieve plate,
said chemical feeder further comprising a collection casing attached to said lower surface of said sieve plate, said collection casing comprising a collection casing chamber that is in fluid communication with said plurality of sieve plate apertures, and
said distributor head residing within said collection casing chamber, wherein at least one of, said distributor head aperture, and said dome hole, are in fluid communication with said collection casing chamber.

13. The chemical feeder of claim 12, wherein said distributor head resides sealingly within said collection casing chamber.

14. A method of treating a body of liquid comprising:
(a) providing the chemical feeder of claim 1;
(b) drawing said feed liquid from said body of liquid;
(c) introducing said feed liquid into said inlet;
(d) removing said treated liquid from said outlet; and
(e) introducing at least a portion of said treated liquid into said body of liquid.

* * * * *